Figure 1:
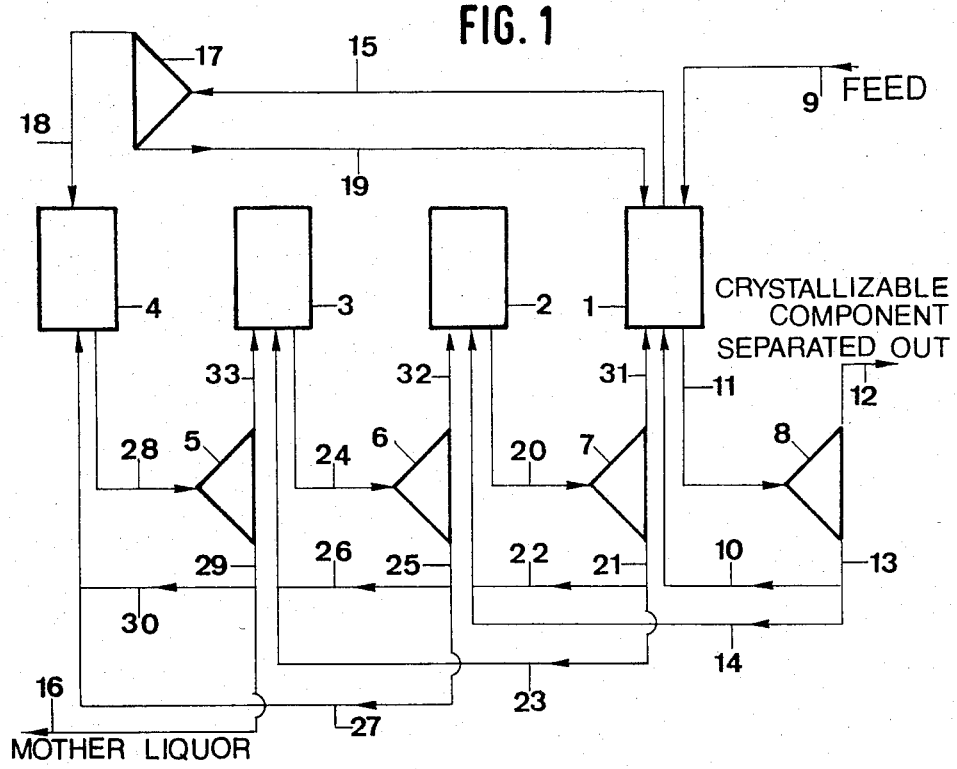

United States Patent [19]

Thijssen et al.

[11] Patent Number: 4,508,553

[45] Date of Patent: * Apr. 2, 1985

[54] PROCESS FOR COUNTERCURRENT CRYSTALLIZATION WITH RECIRCULATION

[75] Inventors: Henricus A. C. Thijssen, Son; Bernardus G. M. van der Malen, Hagestein, both of Netherlands

[73] Assignee: Douwe Egberts Koninklijke Tabaksfabriek-Koffiebranderijen-Theehandel N.V., Utrecht, Netherlands

[*] Notice: The portion of the term of this patent subsequent to Jul. 6, 1999 has been disclaimed.

[21] Appl. No.: 284,947

[22] Filed: Jul. 20, 1981

[30] Foreign Application Priority Data

Jul. 24, 1980 [GB] United Kingdom ............... 8024186

[51] Int. Cl.$^3$ ............................................ B01D 9/02
[52] U.S. Cl. ..................................................... 62/541
[58] Field of Search .................. 62/532, 541; 426/524; 260/DIG. 35, 707; 23/295 R

[56] References Cited

U.S. PATENT DOCUMENTS 3,283,522 11/1966 Ganiaris ............................ 62/541
3,645,699 2/1972 Brodie ............................... 62/545
4,188,797 2/1980 Thijssen et al. .................... 62/545
4,338,109 7/1982 Thijssen et al. .................... 62/541

Primary Examiner—Hiram H. Bernstein
Attorney, Agent, or Firm—Cushman, Darby & Cushman

[57] ABSTRACT

This invention concerns an improved process for separating one crystallizable component from a liquid containing a plurality of components, which comprises passing a stream of said liquid successively through at least part of a series of zones of successively lower temperatures including the zone of lowest temperature, so as to induce the formation of crystals of said one component in each of said zones, passing the crystals formed in each of said zones in a direction countercurrent to the direction of the stream of liquid through at least part of said zones, including the zone of highest temperature, separating the crystals present in the zone of highest temperature from their mother liquor and recovering at least part of these crystals, separating the crystals in the zone of lowest temperature from their mother liquor and recovering that mother liquor, and recirculating part of said crystals present in one zone, from that zone to a zone of lower temperature.

This invention also concerns an apparatus for carrying out the process.

12 Claims, 2 Drawing Figures

U.S. Patent  Apr. 2, 1985  4,508,553

PROCESS FOR COUNTERCURRENT CRYSTALLIZATION WITH RECIRCULATION

This invention relates to a process whereby a crystallizable component is separated from a liquid multi-component system by a process of crystallization, induced by progressively cooling said system. This process involves for example the concentration of fruit juice, vegetable juices and extracts (such as coffee extract), wine, beer and other materials which comprise aqueous solutions which can be concentrated by the formation and removal of ice crystals. However, also inorganic compounds can be separated out from aqueous solutions. Likewise this process may involve the resolution of non-aqueous mixtures of organic compounds.

In continuous, or semi continuous crystallization processes of this kind a stream of the multicomponent liquid system is progressively passed through zones of progressively lower temperatures. In cocurrent processes the crystals formed follow the same direction as the liquid. In counter-current processes the crystals formed are forced in a direction opposite to the direction of the liquid. In co-current processes the crystals have to be separated from the mother liquor at a point of the last zone where this mother liquour is percentagewise richest in components not being the component to be crystallized out and separated. In contrast, in countercurrent processes the crystals are separated out from the suspension in the first zone, where the liquid is comparatively poor in components which do not have to be crystallized out. It stands to reason that it is easier to obtain purity of the component which crystallizes and which has to be separated out, in the last (countercurrent) case than in the first (cocurrent) case. The content of impurities adhering to the crystals will be less. Moreover, in most cases the viscosity in the first zone will be lower, which facilitates the separation of mother liquor from the crystals.

To summarize: generally in cocurrent processes, crystals have to be separated out from a relatively viscous mother liquor, with a relatively high concentration of substances which are to be considered as impurities if they adhere to the crystals, while in countercurrent processes the reverse holds true.

Examples of countercurrent processes of this kind are to be found in U.S. Pat. Nos. 3,283,522 (Ganiaris), 3,645,699 (Brodie) and 4,188,797 (Thijssen).

In this last patent the process described involves freeze concentration, whereby the one component to be separated out is ice, but an apparatus of the same construction can also advantageously by used when said one component is e.g. a crystallizable organic compound.

The present invention provides a process for the separation of one crystallizable component from a liquid containing a plurality of components comprising passing a stream of said liquid successively through at least part of a series of zones of successively lower temperatures including the zone of lowest temperature, so as to induce the formation of crystals of said one component in each of said zones, passing the crystals formed in each of said zones in a direction countercurrent to the direction of the stream of liquid through at least part of said zones, including the zone of highest temperature, separating the crystals present in the zone of highest temperature from their mother liquor and recovering at least part of these crystals, and separating the crystals in the zone of lowest temperature from their mother liquor and recovering that mother liquor, characterized by recirculating part of said crystals present in one zone from that zone to a zone of lower temperature.

The advantages of the process according to the present invention will be discussed hereinafter.

When speaking of "one component" we do not mean that this one component crystallizing out should necessarily have a distinct chemical identity, and certainly not to be already in a state of high purity. In the case whereby we have to do with a freeze concentration process and consequently said one component is ice, the crystals can generally have a high purity. This, however, is e.g. not the case with many mixtures of organic compounds.

Occlusion of components not desired may occur in the crystals, and, all depending on the phase diagram, also "mixed crystals" may crystallize out. In specific cases it is even possible that the product desired has the composition of a mixed crystal. In most cases however a chemically pure product is desired. During their passage from the zone of lowest to the zone of highest temperature recrystallization may occur as the crystals formed in the low temperature zones come in contact, successively in zones of higher temperatures, with liquid with a lower content of "non-desirables"; equilibrium is established between the crystals and the liquid and/or occluded and adhering impurities are gradually removed.

When speaking of "recovering at least part of these crystals" it does not mean that these have to be fed out in their totality from the apparatus as such. One method of feeding out is in several cases to melt the crystals at least partly after they have been separated from the mother liquor. The melt or the melt with crystals still suspended in it can then be fed out as a fluid. Part of the melt can be used as a reflux to "wash" the crystals, as e.g. described in U.S. Pat. Nos. 2,854,494 (Thomas) and 3,645,699 (Brodie).

There are several methods by which the crystals can be induced to follow a path countercurrently to the direction of the stream liquid. One such method is described in U.S. Pat. No. 3,645,699 (Brodie). By this method the zones of different temperatures are not separate, but are, so to say, contiguous to one another. In U.S. Pat. No. 3,283,522 (Ganiaris), there are separate zones and each zone is provided with means to separate the crystals from the liquid and pass these on in a different direction. The same occurs according to U.S. Pat. No. 4,188,797 (Thijssen).

From the above it follows that the term "zone" has to be taken in its broadest sense. Though an advantageous effect can be observed by recirculating part of the crystals present in any one of the zones from that zone to a zone of lower temperature, the best results are generally obtained by recirculation from the zone of highest to the zone of lowest temperature. Although the countercurrent process can in principle be performed while the crystals of any one zone do not pass all to the subsequent zones of higher temperature in succession but e.g. are directed immediately to the zone of highest temperature, preferably the countercurrent process is operated in such a way that all the crystals pass successively through all of the zones with a temperature higher than that of said zone.

The liquid can be fed in the zone of highest temperature. This is to be preferred embodiment in those cases whereby the crystals easily crystallize out in pure condition to wit without occlusion of and not forming mixed crystals with undesired components e.g. when we have to do with ice crystals in a process of freeze concentration.

With many mixture of organic compounds the crystals formed are less pure. In those cases the purity can be increased by feeding the liquid not in the zone of highest temperature, but in a zone intermediate between the zone of highest and the zone of lowest temperature. The crystals of the zone wherein the liquid is fed can in these cases be brought in contact ("washed") with a melt of the crystals of the one component to be recovered. To this purpose the crystals are partly melted and used as a reflux. One example is to be found in U.S. Pat. No. 3,645,699 (Brodie). In that specific case the melt is brought countercurrently in contact with the impure crystals so as to establish equilibrium between the two phases. Cooling in what is called the "refining" section takes care that the melted portion again crystallizes. The refining section described in this patent is combined with an adiabatically operated section, designated as "purifying section", which is also used for purposes of separating crystals and liquid by grafity. The refining section can of course also be combined with e.g. a wash column instead of a separation by grafity.

While the feed in the processes at issue will be generally liquid, it may also contain crystals, thus being a slurry.

It stands to reason that the effect is the more pronounced the greater the recirculation factor for the crystals is. When the recirculated crystals are first separated from the liquid in which they occur, there is in principle no other limit to the recirculation factor than the requirement that in an equilibrated process as much of the "desired" component has to be removed from, as is formed in, the process. Of course, for reasons of economy we shall not push the recirculation factor beyond what is necessary. Depending on circumstances, such as the very nature of the product to be separated out, the concentration of the liquid, the cost of energy, the capital outlay for instrumentation etc., we shall choose the recirculation such as to obtain an economical optimization. In most cases recirculation factors of 1-25% are adequate. Generally a recirculation factor of 2-10% will be preferred. While conveniently and preferentially the recirculation may be accomplished continuously, intermittent recirculation is not excluded.

According to the present invention there is also provided an apparatus for applying the process described above, being an apparatus of the type mentioned above provided with means to recirculate a predetermined quantity of crystals per unit of time from any one stage to a stage of lower temperature. The advantageous effect according to the invention may be understood by the following considerations.

In the zone of highest temperature the crystals will have the largest size, having had time to grow when passing on from the zones of lower temperature to said zone of highest temperature and will have the highest purity. When a number of these crystals are transferred to e.g. the zone of lowest temperature, in which a liquid is present with the highest content of non-desirables, they will have the following effect. At the cooling surface of the zone of lowest temperature nuclei are formed at a high rate. These nuclei are distributed throughout the liquid in that zone by the scraping and stirring mechanism. Now, big crystals having a lower solubility than small crystals, the nuclei are not stable in the presence of the recirculated crystals and most of these nuclei will dissolve again adding to the growth of the recirculated bigger crystals. This means that the crystals ultimately obtained in the zone in question will be bigger than without recirculation as according to the invention. All this means that the crystals which we will ultimately get in the zone of highest temperature will be appreciably bigger than would have been the case without recirculation. It has to be emphasized that separation processes, whatever they may be, are the more easy to operate the bigger the crystals are, and will result in a purer product.

First the bigger the crystals the smaller the surface per weight unit, and consequently the smaller the quantity of mother liquor which may tend to adhere to the crystals. Very important also is the fact that, e.g. in packed bed wash columns, the pressure to be applied for a certain throughout is very dependent on the crystal size, rising sharply as the crystals get smaller. This is especially of importance with crystals of many organic compounds, which, being relatively soft, are easily deformable by pressure. This results in compression of the crystal layer and thus in lower porosity of this layer.

There is one more reason why recirculation according to the invention will produce a purer product. As the nuclei at the cooling surfaces of the crystallizer are formed rapidly there is in many cases an appreciable tendency for impurities to be occluded. When the nuclei redissolve due to the presence of the big recirculated crystals, the material present in those nuclei will settle on those recirculated crystals, but in a more orderly way than by the "shock cooling" at the cold cooling surfaces. Accordingly there will be less tendency for occlusion of impurities.

It may be remarked here to avoid any misunderstanding that the notion of "desired" and "not desired", as used above, only means "desired" or "not desired" to crystallize and does not bear in mind the question whether the component crystallized out is the most valuable one or, in contrast, the less valuable one which by crystallization and subsequent separation has to be eliminated.

Recirculation of the crystals can e.g. be accomplished by withdrawing some of the liquid in the zone of highest temperature with the crystals suspended in it to the zone of lowest temperature. As the case may be a thickening may first take place in order to create a slurry with higher crystal content. This can e.g. be accomplished in a thickener as described in U.S. Pat. No. 4,188,797 (Thijssen).

Many methods for the separation of crystals from their mother liquor have been proposed in continuous crystallization processes. Centrifuges are well known, but wash columns have definite advantages in several instances and have also been described in several patents, see e.g. U.S. Pat. Nos. 2,854,494 (Thomas), 3,587,859 (Probstein), 3,872,009 (Thijssen) and British Patent Application 79,21808 (Published British Patent Application No. 2023564A) (Thijssen).

Wash columns are appropriate whenever a "washfront" can be created at about melting temperature with at the one side the melt of the one component to be separated out and at the other side the mother liquor trapped in between the (as the case may be agglomerated) crystals. This has been extensively discussed is British Patent Application No. 79,21808 (Published British Application No. 2023564A) (Thijssen) for aqueous solutions, whereby the one component to be separated out is ice, but wash columns of the same construction can also advantageously be used when said one component is e.g. an organic crystallizable compound. In U.S. Pat. No. 3,645,699 (Brodie) separation is accomplished by gravity; the crystals of the component to be separated out "falling" through a melt of that same component.

Figure 2:
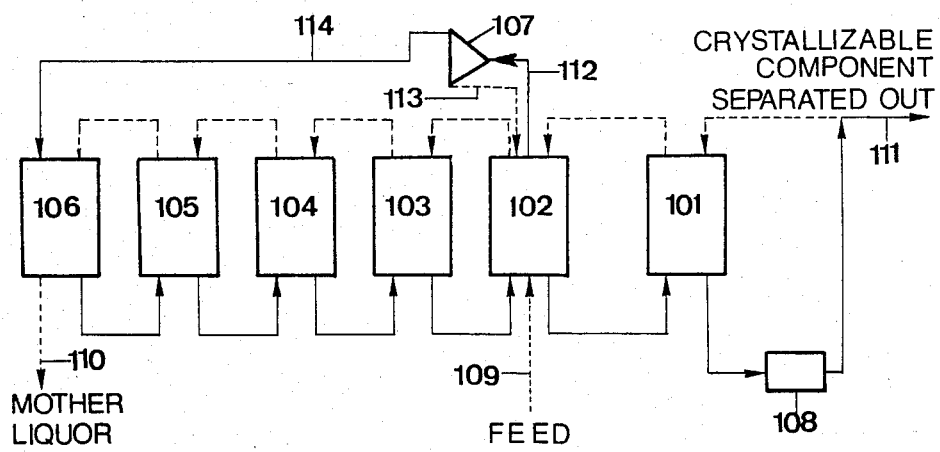

The process according to the present invention will now be further described with reference to the accompanying drawings, in which:

FIG. 1 is by way of example a schematic representation of a flow sheet for a preferred embodiment of the invention, in cases wherein an extra refining section is not necessary; e.g. for freeze concentration; and FIG. 2 is by way of example a schematic representation of a flow sheet in the case that we have to do with a mixture of organic compounds, wherein an extra "refining section" is necessary.

For details of the apparatus which can be used in these cases (that is, of course, without recirculation as according to the present invention) we refer e.g. to U.S. Pat. No. 4,188,797 (Thijssen) and to the British Patent Application No. 79,21808 (Published British Patent Application No. 2023564A) (Thijssen).

Referring to FIG. 1 the four stages of the crystallizer are shown at 1, 2, 3 and 4. Thickeners for crystal slurry appear at 5, 6 and 7, while the final wash column is denoted with 8. At 17 we see an apparatus which operates as thickener or wash column. For this we refer e.g. to FIG. 8 of U.S. Pat. No. 4,188,797 (Thijssen). When the apparatus 17 operates as a thickener, some mother liquor of stage 1 will be introduced in stage 4. It has however been found that generally this does not introduce a major influence on the efficiency of the operation.

The liquid to be concentrated enters at 9 and is fed to stage 1 together with part of the return liquid 10 from wash column 8. Crystal slurry from stage 1 is fed at 11 to wash column 8. At 12 the component separated out is withdrawn from the wash column 8, while at 13 the liquid separated from the crystals is partly returned to stage 1 and 10 and partly, at 14, fed to stage 2. A slurry of crystals is recirculated at 15 from stage 1. It is thickened in 17 and led to stage 4, while the mother liquor is recirculated to stage 1. For the thickening process see U.S. Pat. No. 4,188,797 (Thijssen). The crystals and mother liquor are led countercurrently through the various stages, as will be clear from the figure and as described in detail in the application mentioned above. Mother liquor with the lowest content of the crystallizable component is withdrawn at 16. Further details of the embodiment depicted in FIG. 1 are given in Example 1 (see especially table 1, in which all the different streams of material are described).

Referring now to FIG. 2, (101) to (106) are crystallizer compartments as described in U.S. Pat. No. 4,188,797 (Thijssen) while (107) is a thickener as described in the same patent. At (108) a wash column is shown of the construction as described in British Patent Application No. 79,21808 (Published British Patent Application No. 2023564A) (Thijssen). As described in detail in U.S. Pat. No. 4,188,797 (Thijssen) and also above when discussing FIG. 1, the slurry from each of the compartments is led to a thickener, the thickened slurry is passed on to the preceding compartment (of higher temperature), while the liquid leaving the thickener is partly recirculated to the same compartment and for the rest to the following compartment (of lower temperature), or finally recovered from the last compartment. For reasons of clarity and simplicity in this case only the general direction of flow of the liquid and the crystals are shown, the direction of the liquid being indicated with dotted lines, the direction of the crystals with drawn lines.

The feed enters at (109) in crystallizing compartment (102) and the liquid passes on to (103) up to (106). Mother liquid is recovered at (110).

The compartment (101) functions as a refining section, by a process of recrystallization. The crystals arriving in this compartment from compartment (102) are here brought in contact with a melt of the one component which has to be separated out of the multi-component liquid system. The wash column (108) separates the crystals from their mother liquor. Part of the crystals after melting are returned to the compartment (101), while the rest is recovered at (111). A suspension of crystals (112) is withdrawn from compartment (102) and fed to the thickener (107). The liquid (113) leaving the thickener is returned to the compartment (102), while the thickened slurry of crystals (14) is passed on to the compartment (106) of lowest temperature. Of course more than one refining compartment may be necessary, depending on the specific composition of the liquid to be treated and the purity of the crystallized component desired. Likewise the number of crystallizer compartments depends on the specific case at hand.

The present invention will now be further illustrated by way of the following Examples:

EXAMPLE 1

Red wine was treated in an apparatus and according to the process described above with reference to FIG. 1. Use was made of a crystallizer with four compartments (1)–(4) with the dimensions which were mentioned in U.S. Pat. No. 4,188,797 (Thijssen). A washer column (8) was used as described in British Patent Application No. 79,21808 (Published British Patent Application No. 2023564A) (Thijssen) while the crystals were recirculated as a thickened slurry obtained in a thickener (17), of the construction as described in U.S. Pat. No. 4,188,797 (Thijssen). The wine was threefold concentrated. Referring to FIG. 1 the streams of material were as indicated in table 1.

In a reference experiment the process was run in the same way as described above, but without recirculation of crystals. In this case the streams of material were indicated in table 2.

From these data it is clear that only about 2.5% of the ice crystals finally fed out from the apparatus were recirculated. The average size of the ice crystals being treated in the wash column increased by this small percentage of recirculation two fold, from 70 to 140 micrometer. This resulted in a decrease of the pressure drop in the wash column from 7 atm. to 1.5 atm.

TABLE 1

| | Streams of material with 2.5% recirculation of crystals | |
|---|---|---|
| Nr. of stream | consistency | kg/hour |
| 9 | liquid | 75.00 |
| 12 | melted ice | 50.00 |
| 16 | liquid | 25.00 |
| 11 | slurry | 200.00 |
| 12 | melted ice | 50.00 |
| 13 | liquid | 150.00 |
| 10 | liquid | 56.60 |

TABLE 1-continued

Streams of material with 2.5% recirculation of crystals

| Nr. of stream | consistency | kg/hour |
|---|---|---|
| 14 | liquid | 93.40 |
| 20 | slurry | 157.00 |
| 31 | thick.slurry | 70.65 |
| 21 | liquid | 86.35 |
| 22 | liquid | 16.35 |
| 23 | liquid | 70.00 |
| 24 | slurry | 105.00 |
| 32 | thick.slurry | 47.25 |
| 25 | liquid | 57.75 |
| 26 | liquid | 11.15 |
| 27 | liquid | 46.60 |
| 28 | slurry | 53.00 |
| 33 | thick.slurry | 23.85 |
| 29 | liquid | 29.15 |
| 30 | liquid | 4.15 |
| 16 | liquid | 25.00 |
| 15 | slurry | 5.00 |
| 18 | thick.slurry | 2.25 |
| 19 | liquid | 2.75 |

TABLE 2

Streams of material without recirculation of crystals

| Nr. of stream | consistency | kg/hour |
|---|---|---|
| 9 | liquid | 75.00 |
| 12 | melted ice | 50.00 |
| 16 | liquid | 25.00 |
| 11 | slurry | 200.00 |
| 12 | melted ice | 50.00 |
| 13 | liquid | 150.00 |
| 10 | liquid | 56.60 |
| 14 | liquid | 93.40 |
| 20 | slurry | 152.00 |
| 31 | thick.slurry | 68.40 |
| 21 | liquid | 83.60 |
| 22 | liquid | 13.60 |
| 23 | liquid | 70.00 |
| 24 | slurry | 100.00 |
| 32 | thick.slurry | 45.00 |
| 25 | liquid | 55.00 |
| 26 | liquid | 8.40 |
| 27 | liquid | 46.60 |
| 28 | slurry | 48.00 |
| 33 | thick.slurry | 21.60 |
| 29 | liquid | 26.40 |
| 30 | liquid | 1.40 |
| 16 | liquid | 25.00 |

EXAMPLE 2

The process as generally discussed in FIG. 2 to which we refer here will now be described as applied to the separation of p-xylene from a mixture containing it and other isometric xylenes.

Use is made of a crystallizer with six compartments (101) to (106) with the dimensions which were mentioned in U.S. Pat. No. 4,188,797 (Thijssen). A wash column (108) is used as described in British Patent Application No. 79,21808 (Published British Patent Application No. 2023564A) (Thijssen), while crystals are recirculated as a thickened slurry obtained in a thickener (107) of the construction as described in U.S. Pat. No. 4,188,797. Throughout the apparatus there is a temperature profile from about −11° C. in compartment (101) to −65° C. in compartment (106). The purified p-xylene is recovered at (111) as a melt while the rest is returned to compartment (101). The ratio of recovered to refluxed melt of p-xylene is 5:1. The temperature of the melt is about −15° C. (the melting point of pure p-xylene is +13.26° C.).

In Table 3 the material balance around the total apparatus is given, with a recirculation ratio of crystals of 20%, which goes to say that 80% of the crystals present in compartment (102) are passed on to compartment (101) and 20% is recirculated to compartment (106). In table 3 also the composition is given of the p-xylene fed out at (111).

In table 4 the same data are given in the case that no recirculation of crystals is applied. In both cases the same pressure drop in the wash column is maintained. Comparing table 3 and 4 it is seen that the product purity is increased from 99.5% to 99.9% while at the same time the throughout of the apparatus by the recirculation is increased with 40%.

TABLE 3

Material balance around total apparatus with 20% recirculation of crystals

| | Feed | | crystallizable component separated out | | mother liquor | |
|---|---|---|---|---|---|---|
| | kg/hour | % | kg/hour | % | kg/hour | % |
| Ethyl benzene | 8.18 | 9.55 | .001 | .01 | 8.18 | 2.53 |
| para xylene | 19.34 | 20.80 | 2.669 | 99.92 | 1.07 | .1 |
| metha-xylene | 43.68 | 46.96 | .007 | .05 | 43.67 | 1.37 |
| otho xylene | 1.72 | 2.60 | .002 | .02 | 1.72 | .59 |
| others | 10.08 | 10.09 | .000 | 1.00 | .08 | .0 |
| Total | 93.00 | 100.00 | 2.679 | 100.00 | 10.32 | 10.00 |

TABLE 4

Material balance around total apparatus without 20% recirculation of crystals

| | Feed | | crystallizable component separated out | | mother liquor | |
|---|---|---|---|---|---|---|
| | kg/hour | % | kg/hour | % | kg/hour | % |
| Ethyl benzene | 2.89 | 9.54 | .01 | .12 | 2.89 | 2.52 |
| para xylene | 3.73 | 20.80 | 1.99 | 99.50 | .74 | .2 |
| meta xylene | 11.00 | 46.97 | 1.03 | 1.29 | 0.97 | 1.37 |
| otho xylene | 3.32 | 2.60 | 1.01 | 1.09 | .51 | .59 |
| others | 1.06 | 1.09 | 1.00 | 1.00 | 1.06 | .0 |
| Total | 66.00 | 100.00 | 1.04 | 100.00 | 16.97 | 10.00 |

We claim:

1. A process for separating one crystallizable component from a liquid containing a plurality of components, which comprises passing a stream of said liquid successively through at least part of a series of zones of successively lower temperatures including the zone of lowest temperature, so as to induce the formation of crystals of said one component in each of said zones, passing the crystals formed in each of said zones in a direction countercurrent to the direction of the stream of liquid through at least part of said zones, including the zone of highest temperature, separating the crystals present in the zone of highest temperature from their mother liquid and recovering at least part of these crystals, separating the crystals in the zone of lowest temperature from their mother liquid and recovering that mother liquid, and introducing in one zone a portion of the crystals formed in a preceding zone other than the immediately preceding zone, said portion having a mean crystal size larger than the mean crystal size of the crystals formed in said one zone without said introduction of said portion.

2. A process as claimed in claim 1 wherein said crystals withdrawn from one zone are recirculated to the zone of lowest temperature.

3. A process as claimed in claim 2 wherein the recirculated crystals are passed from the zone of highest to the zone of lowest temperature.

4. A process as claimed in any of claims 1 to 3 wherein the crystals formed in each of said zones are passed countercurrently and successively through all of the zones with a temperature higher than that of said zone.

5. A process as claimed in any of claims 1 to 4 wherein said liquid is fed in the zone of highest temperature.

6. A process as claimed in any of claims 1 to 5 wherein said one crystallizable component to be separated out is water.

7. A process as claimed in any of claims 1 to 5 wherein said one crystallizable component to be separated out is an inorganic compound, and said liquid containing a plurality of components is an aqueous solution.

8. A process as claimed in any of claims 1 to 5 wherein said one crystallizable component to be separated out is an organic compound and said liquid containing a plurality of components contains at least one other organic compound.

9. A process as claimed in claim 8 wherein said liquid is fed in a zone intermediate between the zone of highest and the zone of lowest temperature and a melt of said one component is passed in a direction cocurrent with the direction of the stream of said liquid through the zone(s) with a temperature higher than that of the zone wherein said liquid is fed.

10. A process according to claim 1, 2 or 3, whereby the final separation step is accomplished in a packed bed wash column.

11. In a process as in claim 1 wherein 1–25% of the crystals from the first zone are introduced into the last zone.

12. In a process as in claim 1 wherein 2–10% of the feed out from the first zone is introduced into the last zone.

* * * * *